UNITED STATES PATENT OFFICE.

FRANCIS F. ATKINSON, OF NEW YORK, N. Y., ASSIGNOR OF ONE-THIRD TO WILLIAM H. BELLAMY, TRUSTEE, OF SAME PLACE.

BALL.

SPECIFICATION forming part of Letters Patent No. 456,920, dated July 28, 1891.

Application filed December 9, 1890. Serial No. 374,072. (No specimens.)

*To all whom it may concern:*

Be it known that I, FRANCIS F. ATKINSON, a citizen of Great Britain, and a resident of New York, in the county of New York and State of New York, have invented certain new and useful Improvements in Balls, of which the following is a specification.

My invention has relation to balls for indoor games; and the object of my said invention is to secure a ball which can be used in rooms or other places without danger of breaking or damaging glass, furniture, or walls contained in said rooms. To secure the desired result I utilize the clippings and refuse of sponges or a coarse grade of sponge prepared in the following manner: The sponge to be treated is placed in a vat or other receptacle in a solution of alum and water and allowed to be thoroughly saturated with the solution. It is then withdrawn in suitable quantities and put into a mold or molds of the desired shape and size and allowed to dry in said mold. When taken from the mold in a dry state, it retains the form thus given to it. It is then incased in a net-work of silk, cotton, or other suitable substance. The ball thus formed is very light and possessed of great elasticity and is not liable to break or damage anything it may chance to strike.

Having thus fully described my invention, what I claim, and desire to secure by Letters Patent, is—

A ball composed of sponge treated in substantially the manner described and incased in a net of any suitable material to keep said ball in its initial shape, substantially as and for the purpose set forth.

Signed at New York, in the county of New York and State of New York, this 5th day of December, A. D. 1890.

FRANCIS F. ATKINSON.

Witnesses:
JNO. T. PENNYCOOK,
HARRY M. PETERS.